Aug 5, 1941.  E. A. CORBIN, JR  2,251,481
FLOW CONTROL VALVE
Filed Nov. 6, 1939  6 Sheets-Sheet 3

ELBERT A. CORBIN JR
INVENTOR.

ATTORNEY.

Aug 5, 1941.   E. A. CORBIN, JR   2,251,481
FLOW CONTROL VALVE
Filed Nov. 6, 1939   6 Sheets-Sheet 4

ELBERT A. CORBIN JR
INVENTOR.

BY
ATTORNEY.

Aug 5, 1941.  E. A. CORBIN, JR  2,251,481
FLOW CONTROL VALVE
Filed Nov. 6, 1939  6 Sheets-Sheet 5

ELBERT A. CORBIN JR.
INVENTOR.

BY
ATTORNEY.

ELBERT A. CORBIN JR
INVENTOR.

BY
ATTORNEY.

Patented Aug. 5, 1941

2,251,481

UNITED STATES PATENT OFFICE 2,251,481

FLOW CONTROL VALVE

Elbert A. Corbin, Jr., Lansdowne, Pa., assignor of one-half to William C. Biddle, Lansdowne, Pa.

Application November 6, 1939, Serial No. 303,053

2 Claims. (Cl. 137—153)

My invention relates to a new and useful flow control valve and it relates more particularly to a flow control valve in which the valve is closed or opened by the turning of a rotor as distinguished from the reciprocation of a valve piston, thereby greatly reducing friction and also greatly reducing, if not entirely eliminating, "hysterisis." By "hysterisis" is meant the tendency of the conventional, reciprocating valve to resist the opening or closing operation under pressure and then suddenly to give way when the critical point has been reached thus preventing gradual and smooth operation.

My invention still further relates to a flow control valve which, in addition to being opened and closed by the turning of a rotor instead of the reciprocation of a valve piston, can also be made more compact, more durable and more easily serviced. In this connection it is pointed out that by virtue of the fact that the stem of the rotor turns within but does not reciprocate with respect to its packing, all danger of fouling of the stem resulting in cutting of the shaft and packing and the attendant damage is eliminated as is also the need for constant cleansing and lubrication which have been necessary in connection with conventional reciprocating valves of this character.

My invention still further relates to a valve of this character in which the rotor is adjustably supported on a point bearing at one side and a ball bearing on the other side, whereby the rotor is not only easily actuated but whereby the rotor is also constantly retained in exact, concentric, as well as longitudinal alignment, and whereby the means for adjusting and retaining the rotor in the desired aligned position are at all times easily accessible without in any way necessitating the removal of any material parts or interfering with the operation of the valve.

In certain industries, such as the oil industry for instance, valves of this character are operated by remote control, the valve being urged towards closing or opening position by a spring forming part of the assembly and being urged in the opposite direction by means of air-pressure remotely controlled and delivered. It has been found desirable that all such valves be so constructed as to be completely reversible, that is, instead of being urged towards closing by the spring and towards opening by the air-pressure the valve could be changed to be urged to opening by the spring and to be closed against the action of the spring by the air-pressure. In order to accomplish this with the especially constructed valves, it was necessary to remove the valve entirely from its aligned connections, disassemble, reverse and then reassemble the valve.

It is therefore the object of my invention to provide a valve construction of this character in which by the mere turning of an exposed and easily accessible part, but without any dismantling or disconnecting the valve, I am enabled to reverse the operation in a very short time and without the need of elaborate equipment, or any interference with the operation of the valve.

It has also heretofore been the practice to actuate valves of this character by means of a diaphragm, sensitive to the action of air-pressure, with an oil bath for cooling the moving mechanism, and it is therefore an object of my invention to produce an improved structure in that regard by utilizing a metallic bellows for actuating the rotor of the valve and by providing the housing of said bellows with cooling fins for conducting and radiating the heat in order to protect against deterioration under excessive pressure and for the purpose of preventing great disparity between the temperature and resultant expansion and the air-pressure exerted thus insuring balanced, progressive actuation of the rotor in proportion to the pressure exerted.

In the accompanying drawings:

Fig. 7 represents front elevation of one side of index plate indicating the adjustments of the valve.

Fig. 8 represents front elevation of the opposite side of the index plate showing Fig. 7.

Fig. 9 represents a bottom plan view of Fig. 7 and Fig. 8.

Fig. 10 represents a perspective view of the crank element employed in indicating the valve rotor.

Fig. 11 represents the cross sectional view on line 11—11 of Fig. 10.

Fig. 12 represents a cross sectional view on line 12—12 of Fig. 10.

Figure 1:
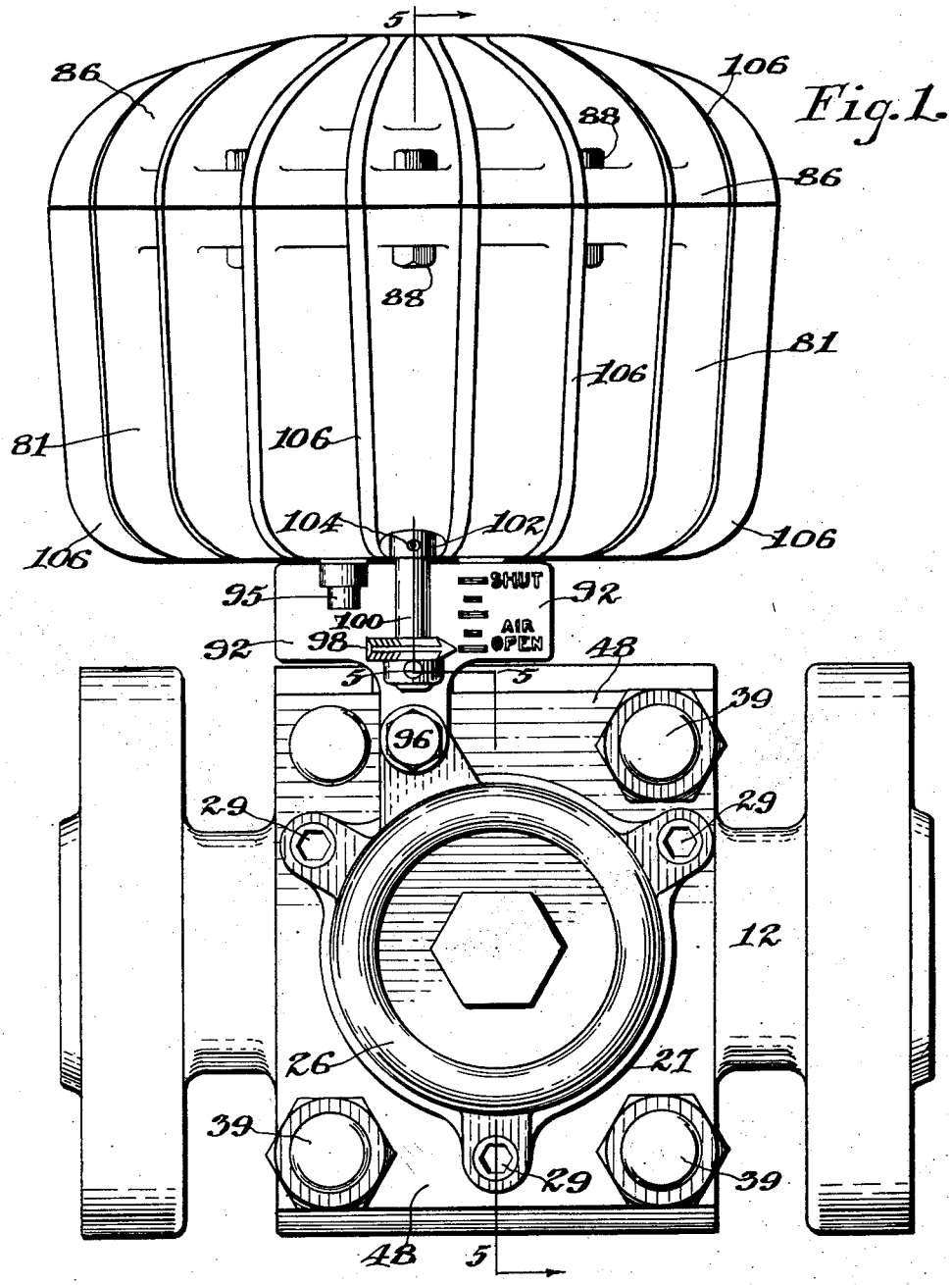
Fig. 1 represents a front elevation of a valve construction embodying my invention.
Figure 2:
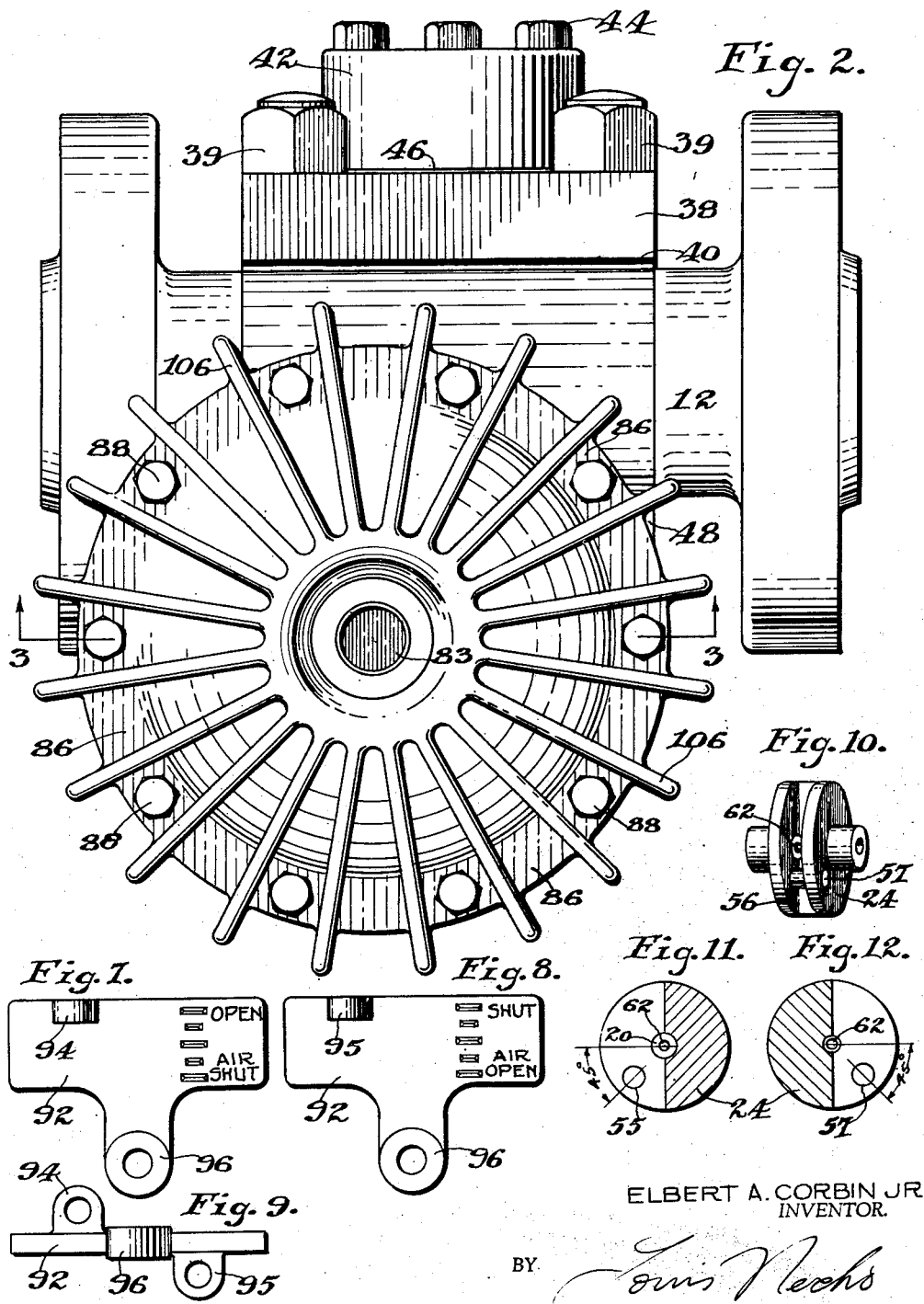
Fig. 2 represents the top plan view of Fig. 1.
Figure 4:
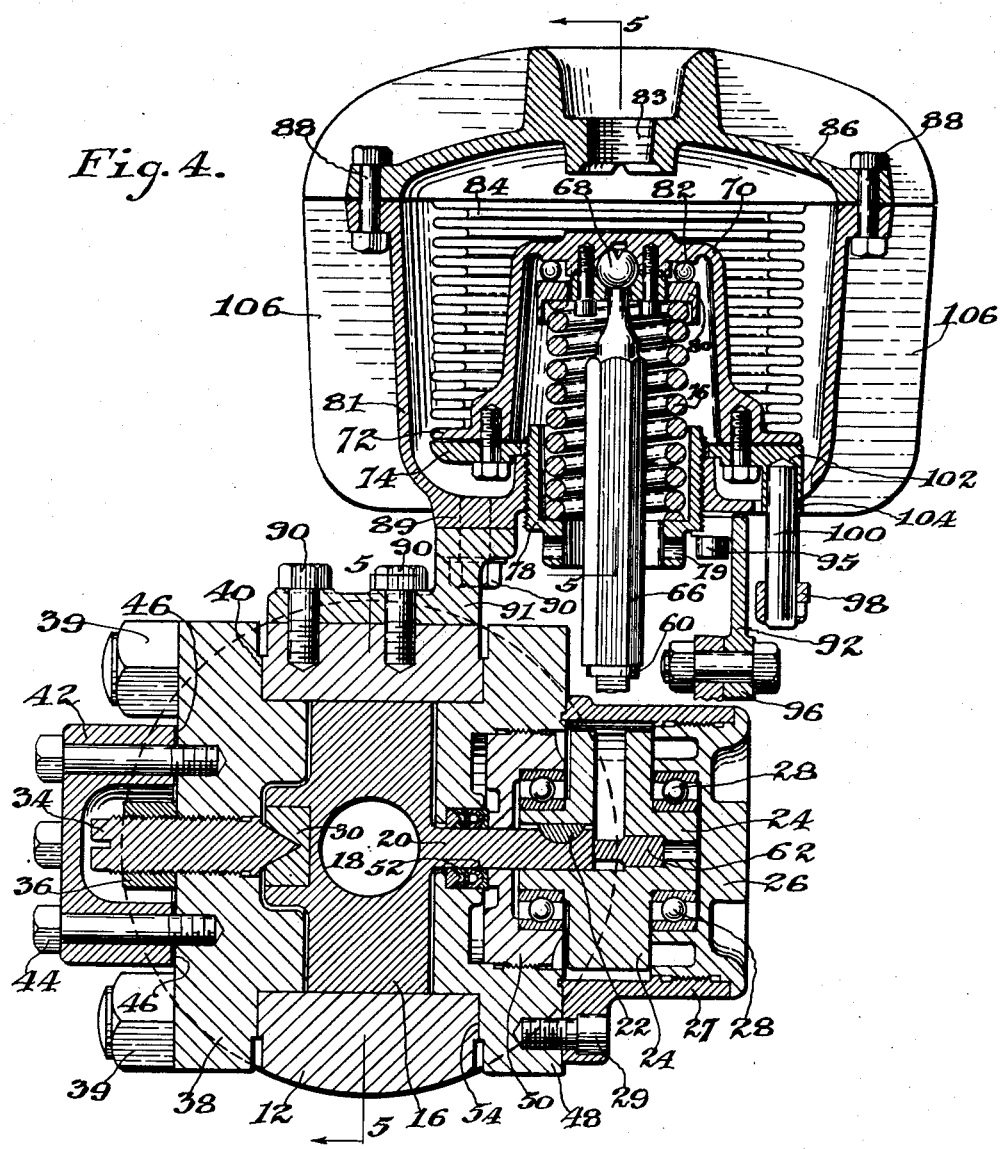
Fig. 4 represents a view similar to Fig. 3, but taken on line 4—4 of Fig. 3 in order to show details of construction.
Figure 5:
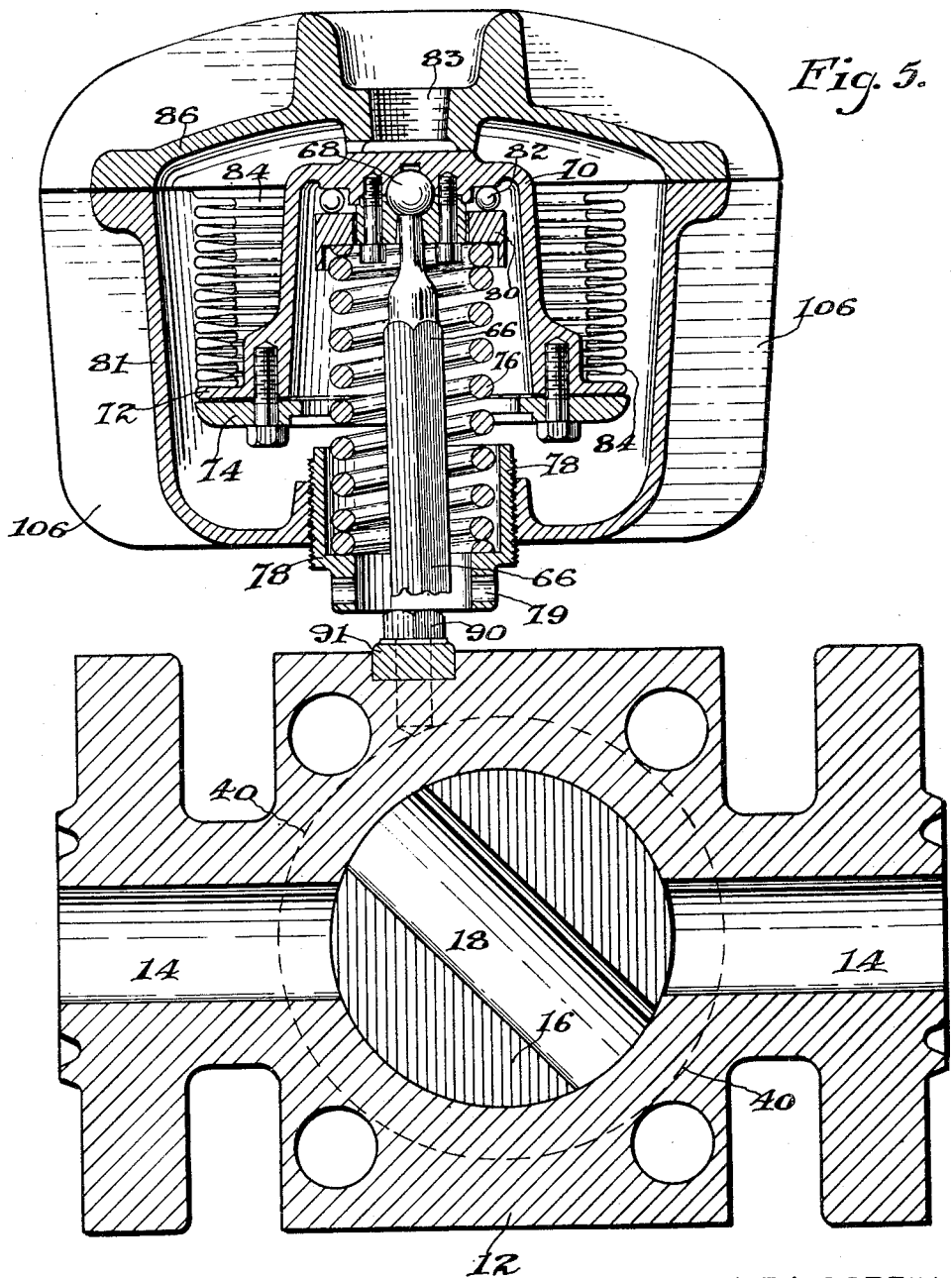
Fig. 5 represents a sectional view on line 5—5 of Fig. 4 showing the valve in the closed position.

Referring to the drawings in which like reference characters indicate like parts, and referring more particularly to Fig. 1, 12 designates a valve casing having the passage or throat 14 which is adapted to be partly or wholly closed by the rotor 16, which is provided with the through opening 18, it being understood that when it is desired partly or completely to open the valve, the opening 18 is brought into partial or complete registration with the opening 14, and when it is desired completely to close the valve the rotor 16 is rotated through an angle of 45° or less to bring the parts into the position best shown at the bottom of Fig. 5. The rotor 16 at one end thereof is provided with a stem 20 (see Fig. 4) which is keyed at 22 to the crank 24. The crank 24 is journalled in the housing 26 and is provided with suitable anti-friction bearings 28. The other end of the rotor 16 is provided with a hardened inset 30 which is engaged by the adjustment screw 34. The screw 34 is in turn held in position by the retaining nut 36. 38 designates a cover which is provided with a ground joint 40 at its junction with the valve housing 12. 42 designates a cap which is secured to the cover 38 by the bolts or screws 44 and, in order to secure a liquid-tight connection, I provide the annular washer or gasket 46. If it is desired to adjust the screw 34, it is merely necessary to remove the cap 42 and loosen the nut 36. The cover 38 is suitably secured in position by any suitable means such as the bolts 39, which also secure the cover 48 on the control side of the valve. 50 designates a spanner nut which retains the packing 52. The housing 26 is threaded to the cylinder 47 which is bolted to the cover 48 by the screws 29. The stem 20 of the rotor 16 turns within the packing 52 instead of reciprocating with respect thereto. The cover 48, like the cover 38 is provided with a liquid-tight ground joint 54. The crank 24 is provided with a pin 56 which is assembled in the holes 55 and 57, and which engages the eye 58 of the drag link 60 (see Figs. 3 and 10). The crank 24 is also provided with a pin 62 which, when the parts are in operative position, abuts against the end of the stem 20 of the rotor 16 to retain the latter against displacement. The drag link 60 is threaded as at 64 into the sleeve 66 which is provided with a polygonal outer surface for engagement by a wrench or the like for a purpose hereinafter set forth. The drag link sleeve 66 is provided with a ball and socket joint 68 for engagement with the top of the bell 70 which is provided with the flange 72 which is bolted to the supporting ring 74. Surrounding the drag link sleeve 66 is a spring 76, this spring being confined between the bottom threaded, adjustment sleeve 78 and the upper thrust plate 80 abutting against the ball bearings 82. The spring adjustment sleeve 78 is provided with the externally accessible spanner wrench holes 79 by means of which the sleeve can be turned while the valve is in operation without removing or dismantling any of the parts. The spring adjusting sleeve 78 is threaded to the housing 81. 84 designates a metallic bellows the lower end of which is engaged between the flange 72 and the ring 74 and the upper end of which is engaged between the upper edge of the housing 81 and the cover 86 and retained by the bolts 88. The cover 86 is provided with the inlet 83 through which compressed air is admitted into the bellows 84. The housing 81 is provided with the bottom bolting 89 which is secured to the bracket 91 of the valve housing 12, by the cap screws 90. 92 designates an index plate which is reversibly secured at 94 and 95 to the housing 81 and at 96 to the cylinder 27 forming part of housing 26 of the valve casing 12, so that the plate 92 serves as a third leg or support between the valve casing 12 and the bellows housing 81. 98 designates an index arrow which is adjustably mounted on the rod 100 which is secured by the set screw 102 in the socket 104 formed in the ring 74. The housing 81 is provided with the cooling fins 106 for radiating heat.

Figure 3:
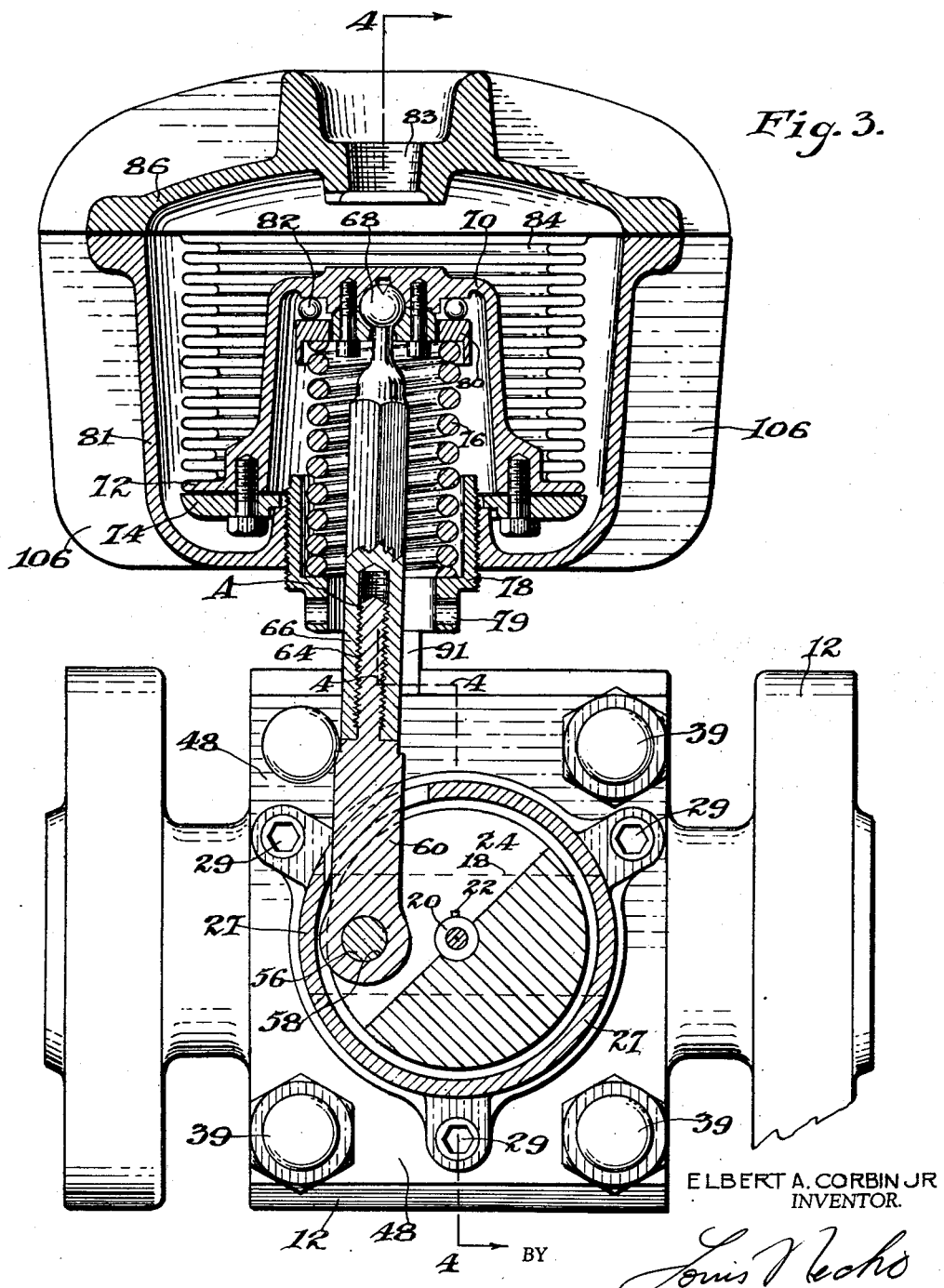
Fig. 3 represents a vertical sectional view taken on line 3—3 of Fig. 2, certain parts being shown in elevation, and with the valve illustrated in a position to be opened by air pressure and to be closed automatically by spring tension.

As shown in Figs. 3 and 4 the valve is in the open position, that is, with the opening 18 of the valve body 16 in the registration with the openings 14 in the valve casing 12. In this position the spring 76 is compressed and the diaphragm 84 is expanded downwardly by the action of compressed air admitted through the inlet 83. This means that the valve is adapted to be thrown into the open position by air-pressure and to be closed by action of the spring 76 when the air pressure is exhausted from the bellows 84. This position is shown in Fig. 1 in which the arrow 98 registers either with the word "Shut" at the top of the index plate or the words "Air open" near the bottom of the plate 92. The extent to which the valve is open is indicated by the registration of the index arrow 98 with corresponding legend disposed between the words "Shut" and "Air open." This indicates to the inspector in the field, not only whether the valve is closed or open partly or wholly, but also that it is set to be opened by air-pressure and to be closed by the spring 76. If it is desired to reverse the operation, that is, to make the valve open by the pressure of the spring 76 and to make it close by the air pressure acting on the diaphragm 84, it is merely necessary to engage the polygonal drag link sleeve 66 with any available wrench and turn the latter to lower the drag link 60 with respect to the sleeve 66 from the position shown at A in Fig. 3 to the position shown at B in Fig. 6. This moves the pin 56 through an arc of 45° from the position shown in solid lines at 55 and 57 in Figs. 11 and 12 to the position shown in dotted lines in these figures.

Figure 6:
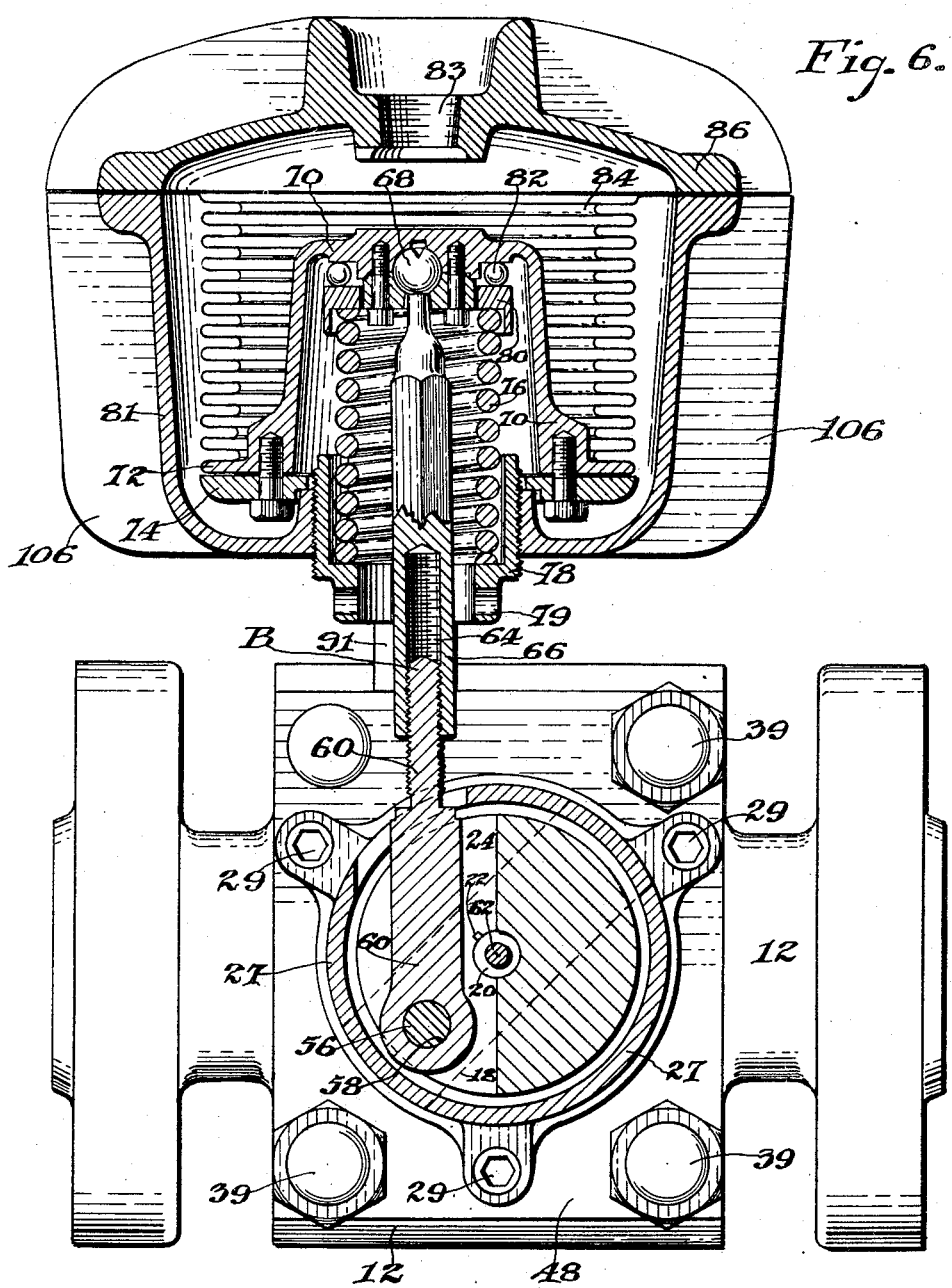
Fig. 6 represents a vertical sectional view similar to Fig. 3 showing the valve construction as adjusted for being opened by means of spring tension and closed by means of air pressure and showing the valve in the closed position.

The operation of the valve and more particularly its reversibility is best illustrated in Figs. 3 and 6, and is as follows: Referring first to Fig. 3, it will be noted that drag link 60 is in its uppermost position with reference to sleeve 66, and that the valve is open, that is, the passage 18 registers with the inlet and outlet 14 as shown in dotted lines at the bottom of Fig. 3. It will also be noted that the bellows 84 is expanded (by air pressure) and that the spring 76 is completely compressed. When the air pressure in the bellows 84 is relieved, the spring 76 expands (as shown at the top of Fig. 5) and collapses the bellows 84. When the spring 76 expands it moves the drag link 60 and the sleeve 66 upwardly thus moving the throat 18 through an angle of 45° and out of registration with the inlet and outlet 14, also as illustrated in Fig. 5. This means that the spring will normally retain the valve in the closed position of Fig. 5, and that it is necessary to introduce compressed air into the bellows 84 in order to bring the throat 18 into alignment with the inlet and outlet 14, to open the valve.

This position of the parts is indicated on one face of the index plate 92 by any suitable legend such as "Air open" shown in Fig. 8, meaning that the compressed air must be turned on to open the valve and that in the absence of compressed air in the bellows 84 the valve is normally closed by the spring 76.

Referring now to Fig. 6 in which the drag link 60 has been lowered with respect to the sleeve 66, it will be seen that the operation is completely reversed. Thus, in the position shown in Fig. 6 the introduction of air to expand the bellows 84 compresses the spring 76 and moves the throat 18 through an angle of 45° in the opposite direction from that shown in Fig. 5 and in which the throat 18 is out of alignment with the inlet and outlet 14, as shown in dotted lines at the bottom of Fig. 6 and in full lines at the bottom of Fig. 5. Conversely, when the air pressure in the bellows 84 is relieved the spring 76 expands to collapse the bellows 84 (as shown at the top of Fig. 5) and to bring the opening 18 into registration with the inlet and outlet 14. Therefore, with the drag link 60 in the position shown in Fig. 6, the valve is normally retained in the open position by the spring and is adapted to be closed by air pressure introduced into the bellows 84. The operation of the valve when the parts are in the position shown in Fig. 6 is indicated by the legend appearing on the opposite face of the index plate 92, and shown in Fig. 7, where the words "Air open" means that, in the absence of air pressure in the bellows 84, the valve would be normally open.

If the operator desires to adjust the valve to the position shown in Fig. 3 the index plate 92 is so mounted as shown in Figs. 1 and 4 with the side thereof shown in Fig. 8 facing outwardly. When it is desired to reverse the operation the sleeve 66 is engaged with a wrench or the like and turned to bring the drag link 60 into the position shown in Fig. 6, and the index plate 92 is disconnected and turned around and again mounted in position with the side thereof, shown in Fig. 7, facing outwardly.

It will be seen from the foregoing that the use of the point bearing 32 and the ball bearings 26 reduces the friction to a minimum particularly since the valve body 16 has a very slight clearance with relation to the valve casing 12, this clearance being so small as not to be shown in the drawings but being enough to permit free rotation. Furthermore, the rotation of the valve body 16 by the crank 24 is positive at all times and reduces the length of the reciprocal stroke that would otherwise be necessary. Since the stem 20 of the valve body 16 rotates at all times within the packings 52 and is always enclosed therein, the ingress of grit or other foreign matter between the stem and the packings is prevented thus protecting the shaft and the packings and greatly prolonging their life. It is also apparent from the structure so far described that the whole assembly is so devised as to be extremely compact compared to reciprocating valves thus effecting considerable economy in the overall length of the valve assembly, and that the assembly is also so constructed as to be easily dismantled for displacement and repair where such may be needed without dismantling any of the other parts which may not be in need of such servicing.

The fins 106 which serve to dissipate the heat that develops are not only intended to protect the parts from excessive heat but also to prevent any excessive heat that may develop from interfering with the accurate operation. Thus, if it is assumed that the valve is to be opened to a certain extent and if it is known from previous experience and calibration that it takes a certain amount of air pressure to open the valve to the desired extent, it would follow that if the air in the diaphragm is subjected to excessive heat its pressure may increase beyond the pressure originally intended to be delivered so that the cooling fins are an aid to accurate control of operation.

Having thus described my invention, what I claim as new and desire to secure by Letters Patent is:

1. A flow control valve comprising a casing, an expandable fluid operated diaphragm therein, a hub operatively connected to and movable with said diaphragm, a valve stem having one end thereof operatively connected to said hub, a spring disposed about and operatively connected to the same end of said valve stem, a valve casing having an inlet and an outlet, a valve plug rotatably mounted in said valve casing and having a through opening therein adapted to be in or out of registration with said inlet and outlet to open or close said valve, a link eccentrically engaging said valve plug, the free juxtaposed ends of said valve stem and said link having adjustable engagement for transmitting the movement of said diaphragm and said spring to said valve plug, the adjustability of said link and said valve stem being sufficient to increase or decrease the effective length of said link by an amount slightly greater than the diameter of said inlet or said outlet, whereby when one extreme of said adjustability is reached said valve plug will be held in the open position by said spring and will be moved to the closed position by the action of said diaphragm, and whereby when the other extreme of said adjustability is reached said valve plug will be held in the closed position by said spring and will be moved to the open position by the action of said diaphragm and vice versa.

2. A flow control valve comprising a casing, an expandable fluid operated diaphragm therein, a hub operatively connected to and movable with said diaphragm, a valve stem having one end thereof operatively connected to said hub, a spring disposed about and operatively connected to the same end of said valve stem, a valve casing having an inlet and an outlet, a valve plug rotatably mounted in said valve casing and having a through opening therein adapted to be in or out of registration with said inlet and outlet to open or close said valve, a link eccentrically engaging said valve plug, the free juxtaposed ends of said valve stem and said link having adjustable, threaded, telescoping engagement for transmitting the movement of said diaphragm and said spring to said valve plug, the adjustability of said link and said valve stem being sufficient to increase or decrease the effective length of said link by an amount slightly greater than the diameter of said inlet or said outlet, whereby when one extreme of said adjustability is reached said valve plug will be held in the open position by said spring and will be moved to the closed position by the action of said diaphragm, and whereby when the other extreme of said adjustability is reached said valve plug will be held in the closed position by said spring and will be moved to the open position by the action of said diaphragm and vice versa.

ELBERT A. CORBIN, Jr.